United States Patent
Goldman et al.

(10) Patent No.: US 6,473,099 B1
(45) Date of Patent: Oct. 29, 2002

(54) AUTOMATICALLY UPGRADING SOFTWARE OVER A SATELLITE LINK

(75) Inventors: Phillip Y. Goldman, Los Altos, CA (US); Joe F. Britt, Jr., Los Gatos, CA (US); Bruce A. Leak, Los Altos, CA (US); Andrew T. McFadden, Sunnyvale, CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/703,172

(22) Filed: Oct. 30, 2000

Related U.S. Application Data

(60) Division of application No. 09/437,887, filed on Nov. 9, 1999, now Pat. No. 6,259,442, which is a continuation-in-part of application No. 09/106,937, filed on Jun. 30, 1998, now Pat. No. 6,023,268, which is a division of application No. 08/755,238, filed on Nov. 22, 1996, now Pat. No. 5,940,074, which is a continuation-in-part of application No. 08/660,088, filed on Jun. 3, 1996, now Pat. No. 6,034,689.

(51) Int. Cl.$^7$ ................................................. G09G 5/00
(52) U.S. Cl. ........................................ 345/749; 709/217
(58) Field of Search ......................... 345/740, 741–743, 345/744–747, 748, 749, 789, 811–812, 814, 750–751, 760, 853–844, 708, 736, 737; 342/357.01; 701/207, 211, 213; 709/217, 224

(56) References Cited

U.S. PATENT DOCUMENTS

| | | | | |
|---|---|---|---|---|
| 5,325,423 A | | 6/1994 | Lewis | 379/90 |
| 5,488,411 A | | 1/1996 | Lewis | 348/8 |
| 5,517,508 A | * | 5/1996 | Slott | 704/217 |
| 5,530,852 A | * | 6/1996 | Meske, Jr. et al. | 395/200.36 |
| 5,538,255 A | | 7/1996 | Barker | 463/41 |
| 5,558,339 A | | 9/1996 | Perlman | 463/42 |
| 5,564,001 A | | 10/1996 | Lewis | 395/154 |
| 5,572,643 A | * | 11/1996 | Judson | 395/200.48 |
| 5,586,257 A | | 12/1996 | Perlman | 463/42 |
| 5,586,260 A | * | 12/1996 | Hu | 395/200.33 |
| 5,612,730 A | | 3/1997 | Lewis | 348/8 |
| 5,623,600 A | * | 4/1997 | Ji et al. | 395/187.01 |
| 5,657,448 A | * | 8/1997 | Wadsworth et al. | 395/200.5 |
| 5,657,450 A | * | 8/1997 | Rao et al. | 395/200.3 |
| 5,678,002 A | * | 10/1997 | Fawrett et al. | 395/183.01 |
| 5,678,041 A | * | 10/1997 | Baker et al. | 395/200.59 |
| 5,680,645 A | * | 10/1997 | Russell et al. | 395/868 |
| 5,695,400 A | * | 12/1997 | Fennell, Jr. et al. | 463/42 |
| 5,696,899 A | * | 12/1997 | Kalwitz | 395/200.1 |
| 5,701,451 A | * | 12/1997 | Rogers et al. | 395/600 |
| 5,706,434 A | * | 1/1998 | Kremen et al. | 395/200.09 |
| 5,706,502 A | * | 1/1998 | Foley et al. | 395/610 |
| 5,710,918 A | * | 1/1998 | Lagarde et al. | 395/610 |
| 5,717,860 A | * | 2/1998 | Graber et al. | 395/200.12 |
| 5,732,268 A | * | 3/1998 | Bizzarri | 395/652 |
| 5,748,896 A | * | 5/1998 | Daly et al. | 395/200.53 |
| 5,752,246 A | * | 5/1998 | Rogers et al. | 707/10 |
| 5,778,372 A | * | 7/1998 | Cordell et al. | 707/100 |

(List continued on next page.)

Primary Examiner—Steven Sax
(74) Attorney, Agent, or Firm—Workman, Nydegger & Seeley

(57) ABSTRACT

Systems and methods for providing an automatic software upgrade over a satellite link. A server automatically downloads software updates over a satellite link to a client after such upgrades become available at the server. The download may be designated as mandatory or non-mandatory. Thus the download may be automatically performed or alternatively may prompt a user at the client to decide whether to accept the upgrade. The download eliminates the need for the client to be actively communicating with network infrastructure for the download to occur and enables the download to take place during low traffic time. Furthermore, the download requires little or no input from a user at the client.

25 Claims, 10 Drawing Sheets

U.S. PATENT DOCUMENTS

| | | | | |
|---|---|---|---|---|
| 5,802,367 A | * | 9/1998 | Held | 395/685 |
| 5,818,441 A | * | 10/1998 | Throckmorton et al. | 345/328 |
| 5,844,552 A | * | 12/1998 | Gaughan et al. | 345/327 |
| 5,854,630 A | * | 12/1998 | Nielsen | 345/352 |
| 5,930,515 A | * | 7/1999 | Ducharne et al. | 395/712 |
| 6,002,394 A | * | 12/1999 | Schein et al. | 345/723 |
| 6,038,594 A | * | 3/2000 | Puente et al. | 709/217 |
| 6,049,671 A | * | 4/2000 | Sliuka et al. | 395/712 |
| 6,052,803 A | * | 4/2000 | Bhatia et al. | 714/49 |
| 6,133,910 A | * | 10/2000 | Stinebruner | 345/721 |
| 6,157,377 A | * | 12/2000 | Shah-Nazaroff et al. | 345/721 |
| 6,160,988 A | * | 12/2000 | Shroyer | 455/32 |
| 6,215,441 B1 | * | 4/2001 | Moeglein et al. | 342/357.01 |
| 6,226,412 B1 | * | 5/2001 | Schwab | 382/232 |
| 6,249,817 B1 | * | 6/2001 | Nakabayashi et al. | 709/224 |
| 6,263,501 B1 | * | 7/2001 | Schein et al. | 725/39 |
| 6,266,612 B1 | * | 7/2001 | Dussell et al. | 701/207 |

* cited by examiner

AUTOMATICALLY UPGRADING SOFTWARE OVER A SATELLITE LINK

RELATED APPLICATIONS

This application is a divisional of U.S. patent application Ser. No. 09/437,887, filed Nov. 9, 1999, now issued as U.S. Pat. No. 6,259,442, which is a continuation-in-part of U.S. patent application Ser. No. 09/106,937, filed Jun. 30, 1998, now issued as U.S. Pat. No. 6,023,268, which is a divisional of U.S. patent application Ser. No. 08/755,238, filed Nov. 22, 1996, now issued as U.S. Pat. No. 5,940,074, which is a continuation-in-part of U.S. patent application Ser. No. 08/660,088, filed Jun. 3, 1996, now issued as U.S. Pat. No. 6,034,689. This application is also related to U.S. patent application Ser. No. 08/656,924, filed Jun. 3, 1996, now issued as U.S. Pat. No. 5,918,013. The foregoing patents are incorporated herein by reference.

BACKGROUND OF THE INVENTION

1. The Field of the Invention

The present invention relates to systems and methods for providing an automatic software upgrade over a satellite link. More specifically, the present invention is directed to systems and methods for downloading the most recent version of a software application to a client with little or no input from a user at the client.

2. The Prior State of the Art

Computer software has proven to be a valuable tool for mankind. Software includes computer-executable instructions which, when executed, perform one or more predetermined functions. There are two major categories of software applications, system software and application software. System software includes the basic software needed to control a computer. Such system software may include, for example, an operating system and a database manager. Applications software uses services provided by the system software, and also provides its own methods to process data for a user. For example, applications software might perform word processing, spreadsheet calculation, flight simulation, or any other conceivable function or group of functions.

A problem encountered by computer users in general is that software applications tend to become outdated quickly. Accordingly, software suppliers periodically produce upgrades, which are often distributed in the same way that the original software was distributed, such as on magnetic or optical disks or other similar storage devices. However, the distribution of software upgrades on storage media such as these has disadvantages. For example, it is inconvenient and sometimes annoying for the user to have to repeatedly install software upgrades, which can be a time-consuming process. Further, a user may not be aware that an upgrade is available or necessary, or the user may forget to obtain or install the upgrade. The failure or delay in installing an upgrade can be detrimental since the upgrade may add valuable new features to the software or remedy a "bug" (i.e., error) in the software. Therefore, what is desired is a technique for allowing a software upgrade to be automatically provided over a network in a manner which requires little or no effort on the part of the user.

Another problem encountered by computer users is that sometimes software or data files becomes corrupted. A "corrupted" file is a file that has been changed presumably unintentionally by a failure in either hardware or software, causing the bits within the file to be altered so as to render the file unreadable as intended. Typically, the corrupted file can only be fixed by re-installing the software, or recovering the data from a backup. Re-installing the software can be time consumer and annoying to the user. Furthermore, recovering of data also conventionally requires extensive user interaction. Also, the user may not have the knowledge or capability to reinstall the software or recover the data. Therefore, what is also desired is a technique for fixing a corrupted file which requires little or no effort on the part of the user.

SUMMARY OF THE INVENTION

The present invention relates to upgrading software stored on a client, such as a computer or set-top box. In one implementation of the invention, a software upgrade is transmitted to the client via a satellite link. The software upgrade occurs automatically with little if any input required from a user. Thus, the upgrade is much more convenient to the user than the traditional methods of upgrading software using a magnetic or optical disk that contains the upgrade. Furthermore, since the upgrade is automatic, there is no risk that the upgrade will be forgone because the user has forgotten or is unaware of the upgrade. Thus, the user can easily and consistently have access to the most recent version of the software available.

As soon as one of the plurality of servers accesses a software upgrade corresponding to the software stored on the client, the server transmits the upgrade to the client over a satellite link. Since the download can occur via satellite transmission, the client need not be linked to or actively communicating over the network infrastructure for the download to occur. Thus, the server might download the upgrade during a low traffic time such as during the night. When the client next begins operation, the client already has the upgrade of the software without the user having done anything.

The present invention may be implemented in a networked computer system having servers connected to a network infrastructure. This network infrastructure may be a local-area network such as an Ethernet or Token ring, or may be a wide-area network such as the Internet. The software to be upgraded is located on a client also connected to the network infrastructure.

The client system may be, for example, a WebTV™ system which includes a television monitor on which to display information retrieved over the network infrastructure. In the case of the Internet, this information might include, for example, a Web page. The server that transmitted the upgrade software may be, for example, a WebTV™ server. In this case, the upgrade software may be an Internet browser.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
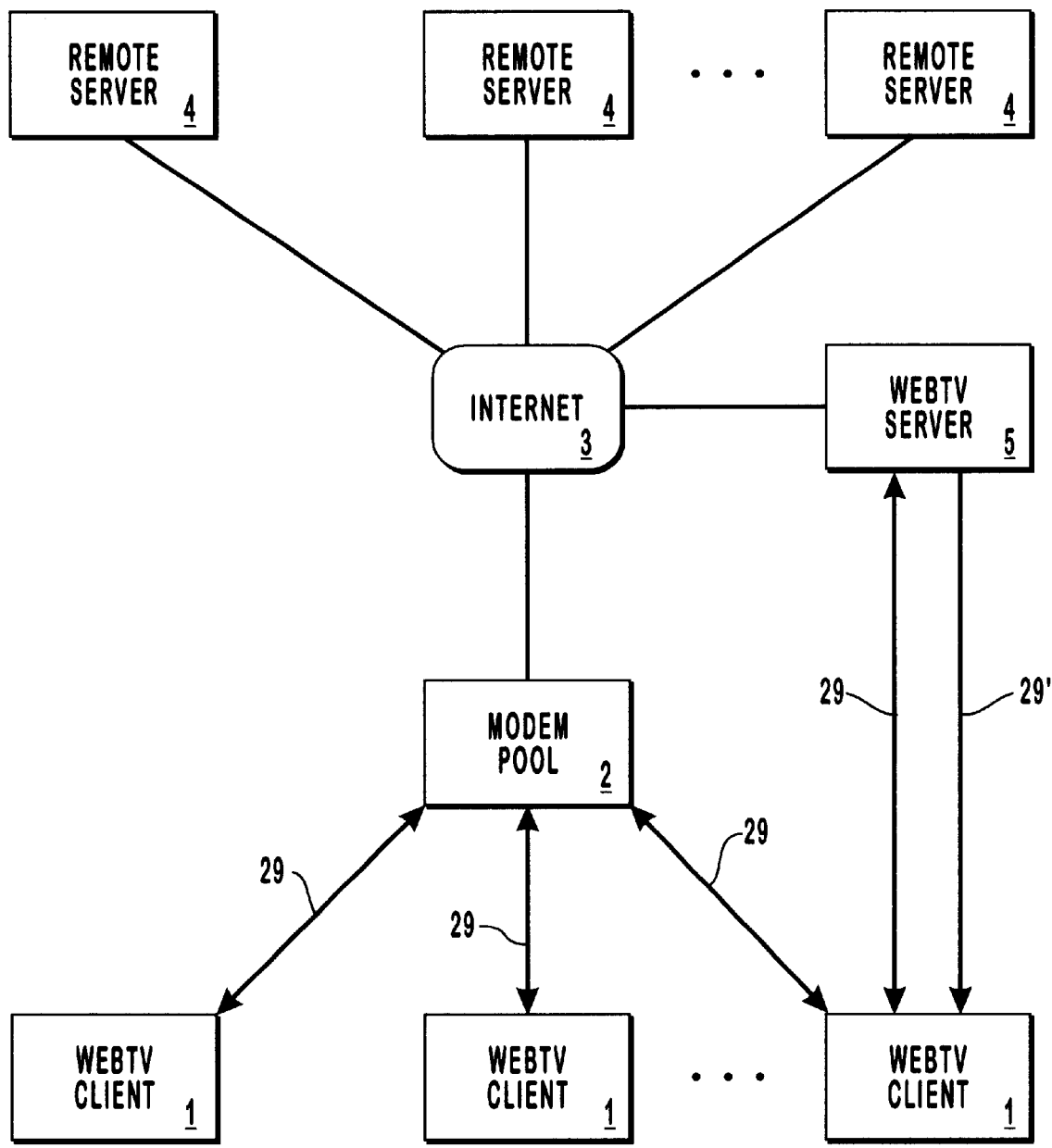
FIG. 1 illustrates several WebTV® client systems connected to a WebTV® server system.

The present invention relates to techniques for obtaining and maintaining operable and updated versions of software at a client connected to a network. In one embodiment, a satellite link in a network is used to download a new version, or an upgrade, of software stored at the computer or set-top box.

In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description.

Embodiments within the scope of the present invention include computer-readable media having computer-executable instructions or data structures stored thereon. Such computer-readable media can be any available media which can be accessed by a general purpose or special purpose computer such as a set-top box. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data structures and which can be accessed by a general purpose or special purpose computer.

When information is transferred or provided over a network or another communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device such as a set-top box to perform a certain function or group of functions.

Although not required, the invention will be described in the general context of computer-executable instructions, such as program modules, being executed by computers or set-top boxes in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein.

Those skilled in the art will appreciate that the invention may be practiced in network computing environments with many types of computer system configurations, including set-top boxes, personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked through a communications network. In a distributed computing environment, program modules may be located in both local and remote memory storage devices.

In one embodiment, the present invention is implemented in a set-top box that is connected to a television and to one or more servers over the Internet. The set-top box includes a processing system that executes browser software to enable a user to browse through World-Wide Web pages displayed on the television using a remote control device. As will be described below, the browser is upgraded or reconfigured by downloading to the set-top box replacement software or data transmitted from a server over the satellite network and then writing the replacement software or data into a programmable, non-volatile memory in the set-top box.

For example, the present invention may be included in a system known as WebTV®, which uses a standard television set as a display device for browsing the Web and which connects to a conventional network, such as the Internet, using standard telephone, ISDN, or similar communication lines. In accordance with the present invention, a user of a WebTV® client system can utilize WebTV® network services provided by one or more remote WebTV® servers. The WebTV® network services are used in conjunction with software running in a WebTV® client system to browse the Web, send electronic mail, and to make use of the Internet in various other ways. The WebTV® servers function as proxies by retrieving, from a remote server, Web pages or other data requested by a WebTV® client system and then transmitting the requested information to the WebTV® client system. Although the invention is described herein largely in the context of WebTV® components, the invention can be practiced with any other networks of components that are adapted to perform the functions disclosed herein. Thus, any reference to WebTV components, networks, services, etc. also apply to any other analogous components, networks, and services.

1. System Overview

FIG. 1 illustrates a configuration of a WebTV® network with which the invention can be practiced according to one embodiment. A number of WebTV® client systems 1 (hereinafter, "client 1") are coupled to a modem pool 2 via direct-dial, bi-directional data connections 29, which may be telephone lines (POTS, i.e., "plain old telephone service"), ISDN (Integrated Services Digital Network), T-1, or any other similar type of connection. The modem pool 2 is a conventional modem pool, such as those provided by Internet Service Providers (ISPs). The modem pool 2 is coupled typically through a router, such as that conventionally known in the art, to a number of remote servers 4 via a conventional network infrastructure 3, such as the Internet (hereinafter, "the Internet 3").

The WebTV® system also includes a WebTV® server system 5 (hereinafter, "the server 5") which specifically supports the clients 1 by, for example, providing the WebTV® services to the clients 1. Each of the clients 1 can communicate with the server 5 either directly or indirectly through the Internet 3 via the modem pool 2 using connections 29. In addition, information may be downloaded from the server 5 to the client 1 using a conventional satellite link 29'.

A. Server System Architecture

Figure 2:
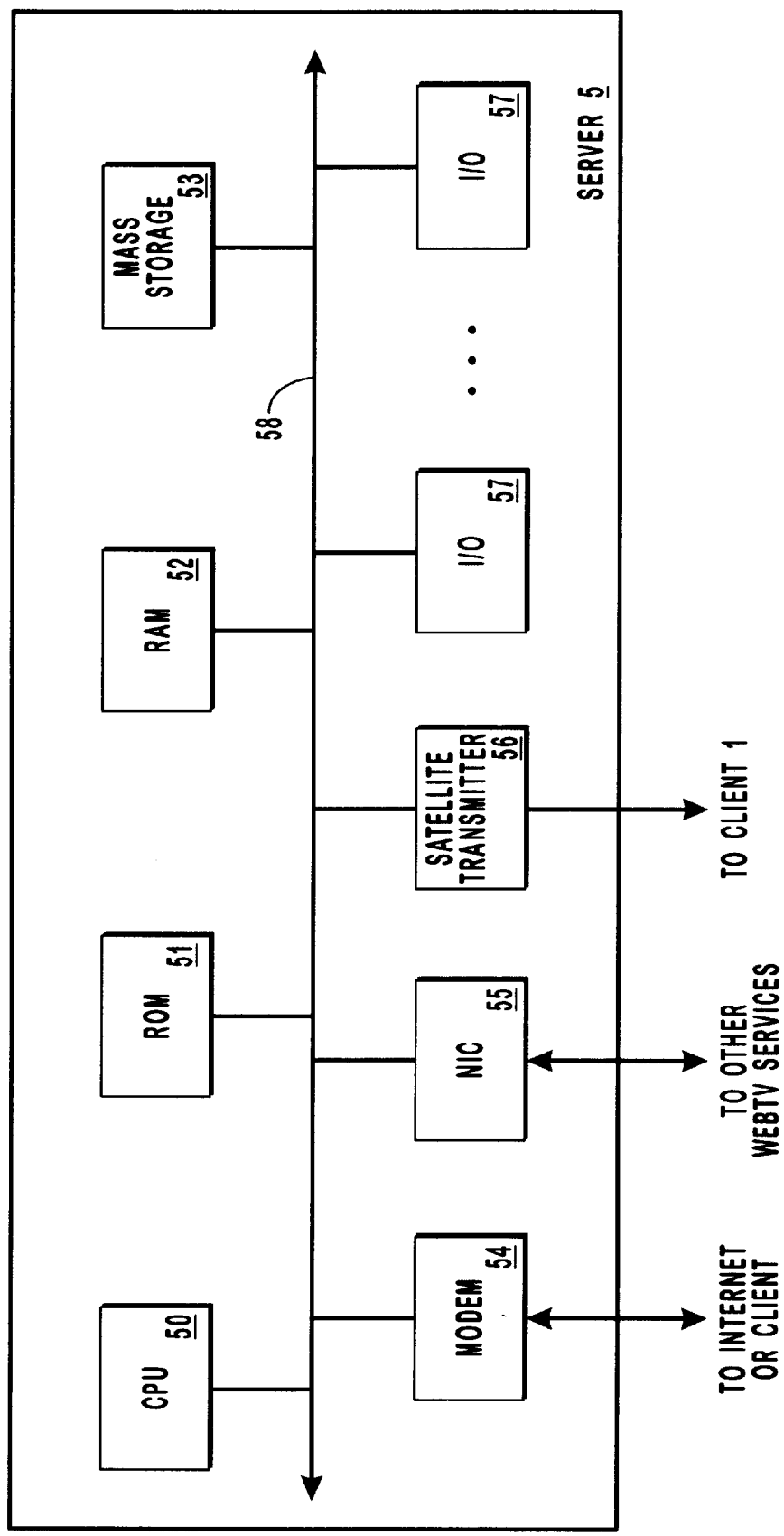
FIG. 2 illustrates a WebTV® server system.

The server 5 includes one or more computer systems generally having the architecture illustrated in FIG. 2. It should be noted that the illustrated architecture is only exemplary; the server 5 is not constrained to the illustrated architecture. The illustrated architecture includes a central processing unit (CPU) 50, read-only memory (ROM) 51, random access memory (RAM) 52, a mass storage device 53, a modem 54, a network interface card (NIC) 55, a satellite transmitter 56, and various other input/output (I/O) devices 57. Mass storage device 53 includes a magnetic, optical, or other equivalent storage medium I/O devices 57 may include any or all of devices such as a display monitor, keyboard, cursor control device, etc. Modem 54 is used to communicate data to and from remote servers 4 via the Internet. The satellite transmitter 57 is used to transmit information to the client 1 over the satellite link 29'.

As noted above, the server 5 may actually comprise multiple physical and logical devices connected in a distributed architecture. Accordingly, NIC 55 is used to provide data communication with other devices that are part of the WebTV® services. Modem 54 may also be used to communicate with other devices that are part of the WebTV® services and which are not located in close geographic proximity to the illustrated device.

B. Client System Architecture

Figure 3:
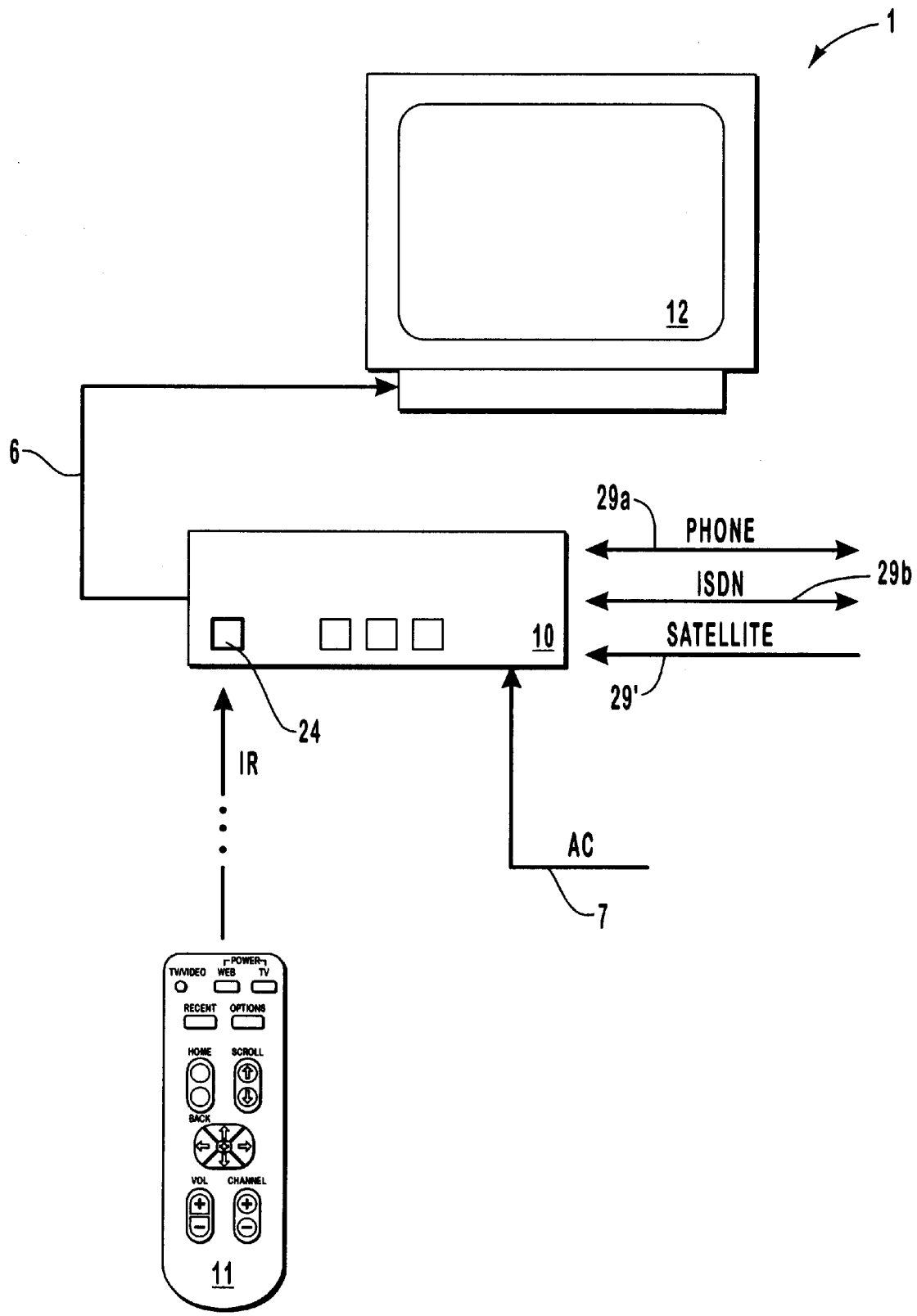
FIG. 3 illustrates a WebTV® client system.

FIG. 3 illustrates a client 1 with which the invention can be practiced according to one embodiment. The client 1 includes an electronics unit 10 (hereinafter referred to as "the WebTV® box 10" or "the box 10", an ordinary television monitor 12, and a hand-held remote control 11. In an alternative embodiment of the present invention, the box 10 is built into the television set 12 as an integral unit. The box 10 includes hardware and software for providing the user with a graphical user interface, by which the user can access the WebTV® network services, browse the Web, send e-mail, and otherwise access the Internet.

The client 1 uses the television set 12 as a display device and an audio output device. The box 10 is coupled to the television set 12 by a link 6. The link 6 includes an audio channel for generating sound from the television's speaker and a video channel in the form of RF (radio frequency), S-video, composite video, or other format. The communication link 29 between the box 10 and the server 5 is either a telephone (POTS) connection 29a, an ISDN connection 29b, or any other type of terrestrial link. Connections 29a and 29b represent examples of two-way communications links. In addition, FIG. 3 illustrates a satellite link 29', which is a one-way communication link to the client 1. The box 10 receives AC (alternating current) power through an AC power line 7.

Remote control 11 is operated by the user in order to control the client 1 to browse the Web, send e-mail, and perform other Internet-related functions. The box 10 receives commands from remote control 11 via an infrared (IR) communication link. In alternative embodiments, the link between the remote control 11 and the box 10 may be RF or any equivalent mode of transmission.

The box 10 includes application software which, when executed by a processor in the box 10, provides the user with a graphical user interface by which the user can access the WebTV® network services and browse the Web. The application software is automatically executed upon application of power to the box 10.

Figure 4:
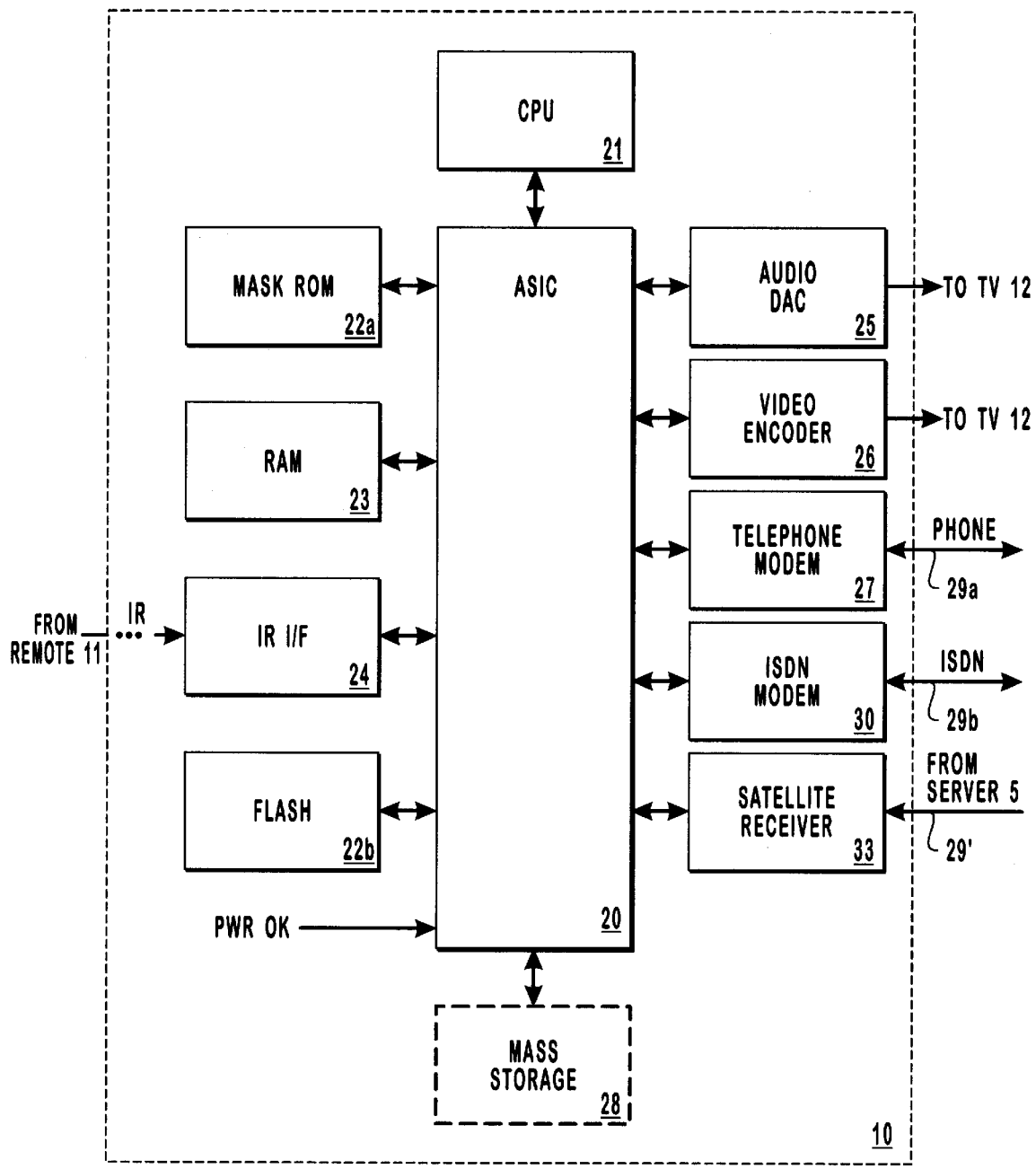
FIG. 4 is a block diagram of an electronics unit of a WebTV® client system.

FIG. 4 shows the internal components of the box 10. Operation of the client 1 is controlled by a CPU 21, which is coupled to an Application-Specific Integrated Circuit (ASIC) 20. The CPU 21 executes software designed to implement features of the present invention. ASIC 20 contains circuitry which is used to implement certain functions of the WebTV® system. ASIC 20 is coupled to an audio digital-to-analog converter 25 which provides audio output to television 12. In addition, ASIC 20 is coupled to a video encoder 26 which provides video output to television set 12. An IR interface 24 detects IR signals transmitted by remote control 11 and, in response, provides corresponding electrical signals to ASIC 20. A standard telephone modem 27 and an ISDN modem 30 are coupled to ASIC 20 to provide connections 29a and 29b, respectively, to the modem pool 2 and to the server 5. Note that, while the illustrated embodiment includes both a telephone modem 27 and an ISDN modem 30, either one of these devices will suffice to practice the present invention. Further, in various other embodiments, the telephone modem 27 and the ISDN modem 30 each may be replaced by or supplemented with other communications devices, such as a cable television modem. In addition, in other embodiments, communication with the server 5 might be made via a token ring or Ethernet connection. Note that the box 10 also may include a cable television modem (not shown). A satellite receiver 33 is coupled to the ASIC 20 to receive data over the satellite link 29'.

Also coupled to ASIC 20 is mask Read-Only Memory (ROM) 22a, a flash memory 22b, and a Random Access Memory (RAM) 23. Mask ROM 22a (which is so named because it is non-programmable) provides storage of certain program instructions and data, as will be described below. Flash memory 22b is a conventional flash memory device that can be written to (programmed) and erased electronically. Flash memory 22b provides storage of the browser software as well as data. In one embodiment, a mass storage device 28 is included in the box 10 and coupled to ASIC 20. The mass storage device 28 may be used to input software or data to the client or to download software or data received over connection 29 or 29'. The mass storage device 28 includes any suitable medium for storing machine-executable instructions, such as magnetic disks, optical disks, and the like.

Figure 5:
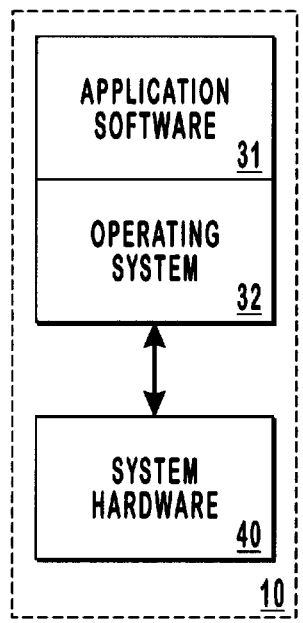
FIG. 5 illustrates the functional relationship between hardware and software in the client processing system of FIG. 1.

As mentioned above, the box 10 includes application software including a Web browser. Referring now to FIG. 5, the above-mentioned application software 31 operates in conjunction with operating system (OS) software 32. The OS software 32 includes various device drivers and otherwise provides an interface between the application software 31 and the system hardware components 40 (i.e., the elements illustrated in FIG. 4).

In one embodiment, the application software 31 and the OS software 32 are stored in flash memory 22b. It will be recognized, however, that some or all of either the application software 31 or the OS software 32 or both can be stored in any other suitable storage medium, such as mask ROM 22a or mass storage device 28, in various embodiments.

As mentioned above, steps according to the present invention are embodied in machine-executable instructions according to one embodiment. For example, in one embodiment, the present invention is carried out in the WebTV® box 10 by the CPU 21 executing sequences of instructions contained in mask ROM 22a, flash memory 22a, or RAM 23, or a combination of these devices. More specifically, execution of the sequences of instructions causes the CPU 21 to perform the steps of the present invention. These steps will be described below.

Instructions for carrying out the present invention may be loaded into memory from a persistent store, such as mass storage device 28, and/or from one or more other computer systems over a network, such as the server 5 or a remote server 4. For example, such a server system may transmit a sequence of instructions to the client 1 in response to a message transmitted to the server system over the Internet 3 by the client 1. As the client 1 receives the instructions via a network connection, such as modem 27, modem 30, or satellite receiver 33, the client 1 stores the instructions in a memory. The client 1 may store the instructions for later execution or execute the instructions as they arrive over the network connection.

In some embodiments, the downloaded instructions may be directly supported by the CPU 21. Consequently, execution of the instructions may be performed directly by the CPU 21. In other embodiments, the instructions may not be directly executable by the CPU 21. Under these circumstances, the instructions may be executed by causing the CPU 21 to execute an interpreter that interprets the instructions, or by causing the CPU 21 to execute instructions which convert the received instructions into instructions that can be directly executed by the CPU 21.

Certain embodiments and aspects of the present invention may be carried out in the server 5, instead of (or in addition to) being carried out in the client 1. For example, the CPU 50 of the WebTV server 5 may execute instructions stored in memory to perform steps in accordance with the present invention.

In various embodiments, hardwired circuitry may be used in place of, or in combination with, software instructions to implement the present invention. Thus, the present invention is not limited to any specific combination of hardware circuitry and software, nor to any particular source for the instructions executed by a computer system.

2. Remote Download

As indicated above, the browser software can be upgraded, reconfigured, or restored downloading to the box replacement software or data transmitted from a server via the Internet, a direct phone connection, or via a satellite link 29'. FIGS. 6–11 illustrate various techniques of upgrading and restoring software at the client.

The programmable nature of flash memory 22b and its ability to retain programmed information in the absence of power are used to advantage in performing such an upgrade or reconfiguration. As will be explained in greater detail below, replacement software or data transmitted from the server 5 (or another server designated by the server 5) is automatically written into the flash memory 22b in the box 10. In addition, the flash memory can be used to store various resources downloaded from the Web, such as Java applets (programs), so that such resources will be retained in the event of loss of power to the client 1. Note that the present invention does not necessarily require use of a flash memory for these purposes; other forms of programmable non-volatile memory may be used, such as an electrically-erasable programmable ROM (EEPROM).

A download from the Internet 3 can be performed for purposes of upgrading the client 1 or reconfiguring the client 1 to correct an inconsistent state or corruption (e.g., an error in the program instructions or data). The client 1 determines whether a download from the network should take place each time the client 1 is reset. More specifically, a download will be performed if, upon reset, the client system 1 detects an error condition or, in the case of an upgrade, the client system 1 finds a download request in memory. If the satellite link 29' is available, the server 5 might initiate a download to download browser software updates as they become available, without requiring a request from the client 1.

Figure 6:
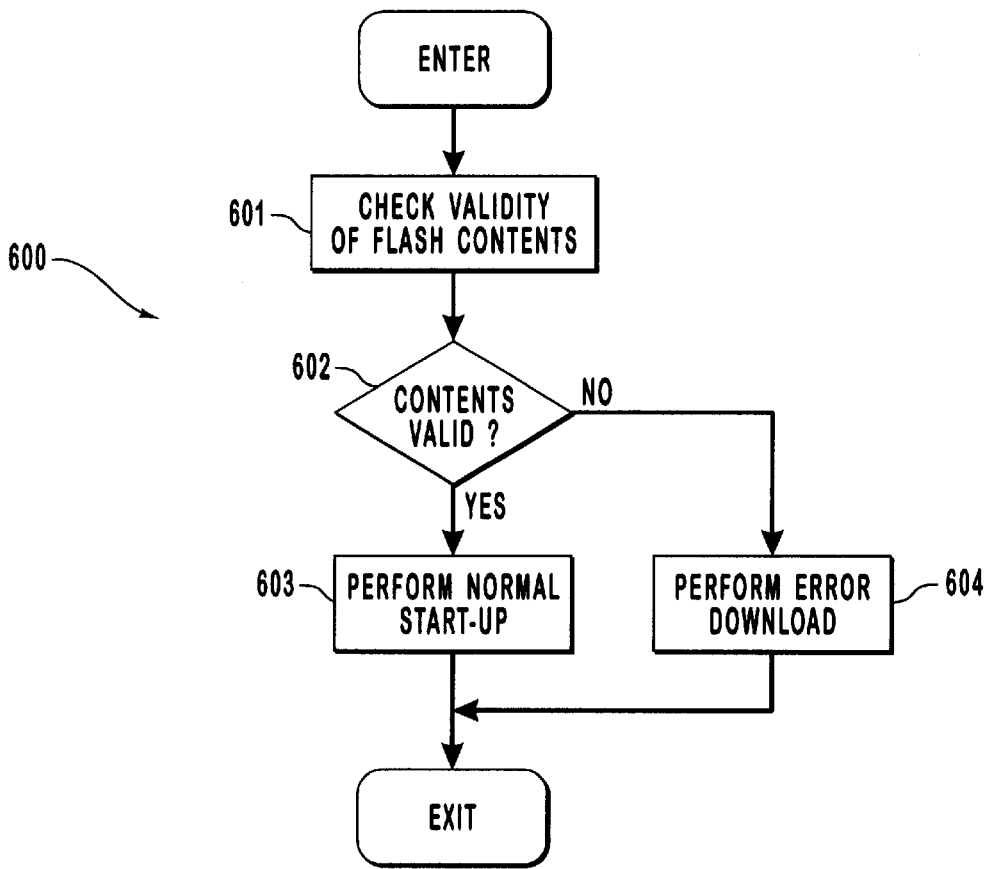
FIG. 6 is a flow diagram illustrating a reset routine for a WebTV® client system.

FIG. 6 illustrates a method 600 performed by the client for restoring corrupted software according to a first embodiment of the invention. In this embodiment, the method may be embodied in a reset routine that is performed any time the client 1 is reset during operation or any time the box 10 is powered on. For example, the client system 1 may perform the method 600 of FIG. 6 by execution of start-up instructions stored in the mask ROM 22a (FIG. 4).

In step 601, the validity of the stored program instructions (e.g., an Internet browser) is checked to ascertain whether a corrupted state exists in the computer instructions stored on the client 1 using a step of automatically checking. These computer instructions may be stored, for example, on the flash memory 22b of the client system 1. This step of automatically checking may be performed by the client system 1 in response to software, hardware, or a combination of both. Any of a variety of routines may be used to check the validity of the stored instructions such as, for example, a conventional checksum technique.

If the contents are valid (yes in decision block 602), then the normal start routine is performed in step 603. If the contents of flash memory 22b are corrupted (no in decision block 602), then an error download routine is performed (step 604). In the error download routine, some or all of the corrupt information in the flash memory 22b is replaced by correct information downloaded from the server 5. The error download routine is described further below with respect to FIG. 9 and FIG. 10. Thus, the WebTV® system allows errors in the programming or data to be detected and automatically corrected by performing the error download routine, without intervention by the user of the WebTV® client system 1.

Figure 7:
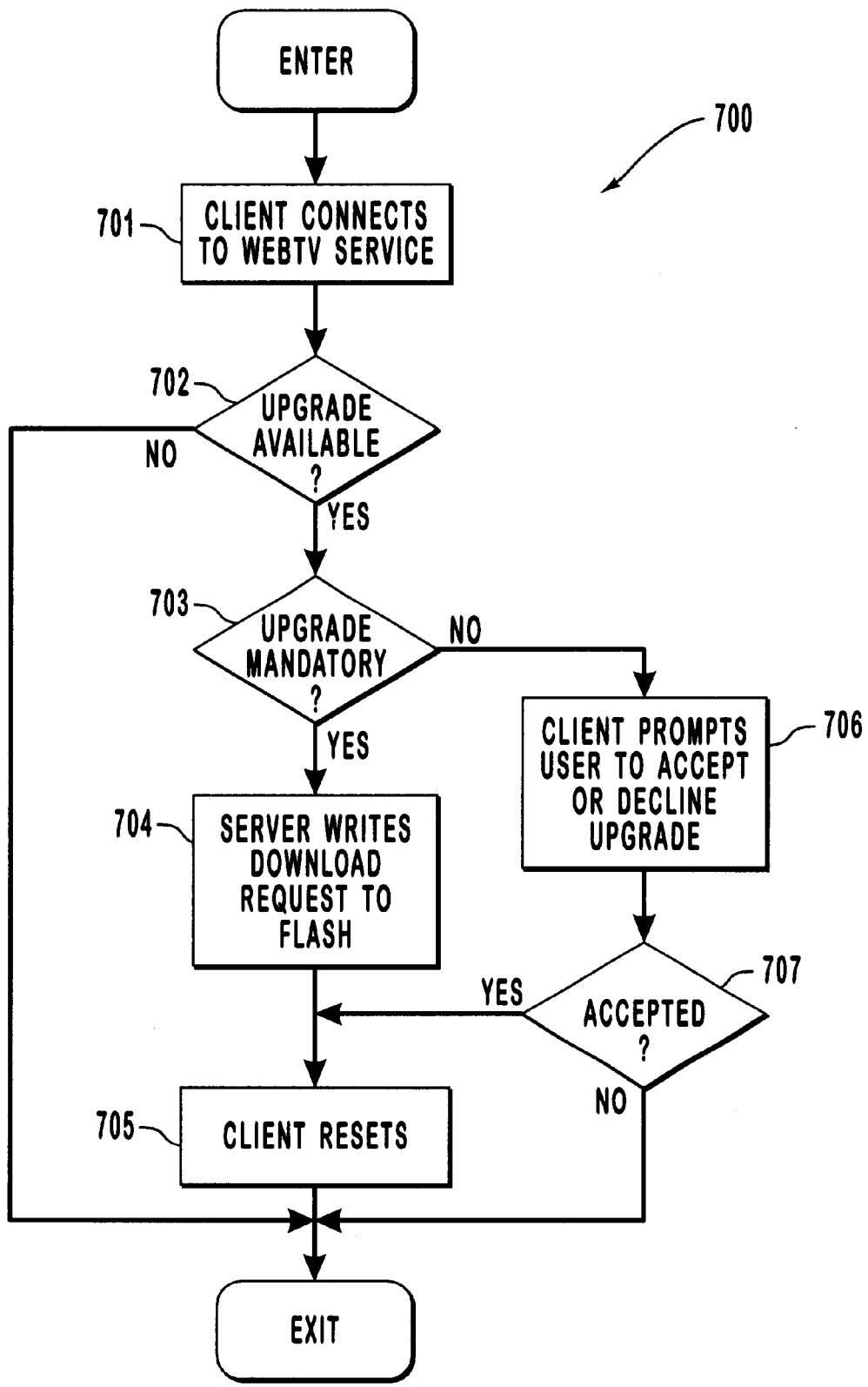
FIG. 7 is a flow diagram illustrating a normal start-up routine for initiating an upgrade of a WebTV® client system over the network.
Figure 8:
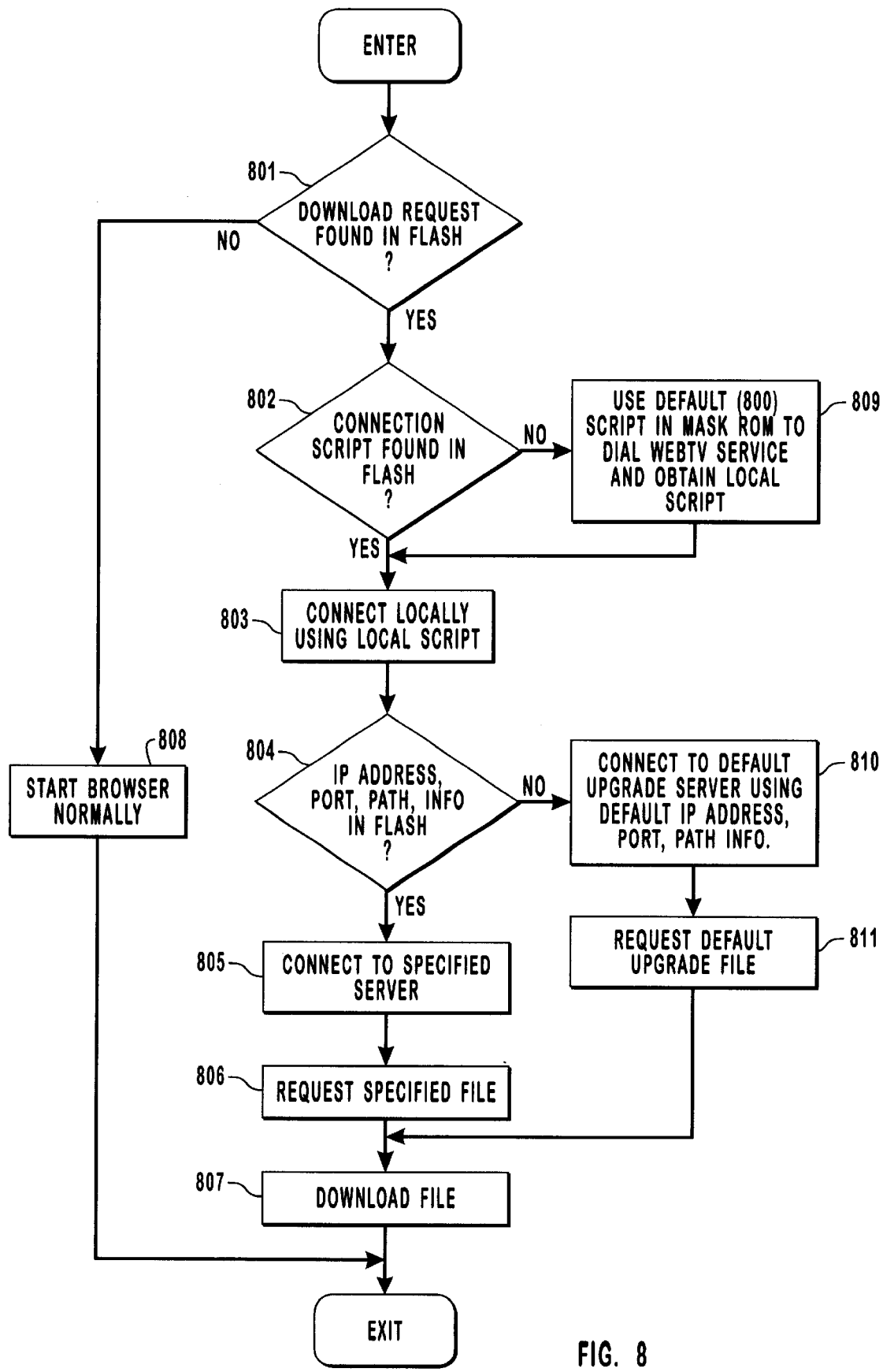
FIG. 8 is a flow diagram illustrating a routine for initiating a download for the purpose of upgrading a WebTV® client system.

FIGS. 7 and 8 illustrate an optional extension of method 600 of FIG. 6, whereby a new version or upgrade of software is automatically made available to the client system. FIG. 7 depicts a routine 700 by which an upgrade of the Internet browser is initiated during a normal start-up (e.g., step 603 of FIG. 6). Initially, the client 1 automatically connects to the WebTV® server 5 (step 701). Generally, this connection is made via the modem pool 2 by executing a connection script. If an upgrade is determined to be available (yes in decision block 702), and the upgrade is designated as mandatory (yes in decision block 703), then the server 5 sends a command to the client 1 to cause a download request to be written into the flash memory 22b of the client 1 (step 704). The client 1 is then commanded by the WebTV® server 5 to reset (step 705). On the other hand, if an upgrade is determined to be available (yes in decision block 702), but the upgrade is not designated as mandatory (no in decision block 703), then the client 1 prompts the user to either accept or decline the upgrade (step 706). If the upgrade is accepted (yes in decision block 707), then the client 1 resets (step 705). If not (no in decision block 707), the routine ends.

FIG. 8 illustrates portions 800 of the normal start-up routine for initiating an upgrade. Initially, the client 1 determines whether a download request is present in flash memory 22b (decision block 801). If not (no in decision block 801), the browser program is started normally (step 808). If a download request is found in flash memory 22b (yes in decision block 801), then it is next determined whether a connection script is present in flash memory 22b (decision block 802).

As mentioned above, the connection script is executed to establish communication with the WebTV® server 5 or the modem pool 2. Generally, a local connection script is stored in flash memory 22b to allow connection to the local modem pool 2. A default connection script is stored in mask ROM 22a, which allows direct connection to the WebTV® server 5 using a toll-free (e.g., "1-800-") telephone number. The default connection script is generally used only if a local connection script is not found in flash memory 22b.

Referring still to FIG. 8, if the local connection script is found in flash memory 22b (Yes in decision block 802), then the client 1 uses that connection script to connect to the WebTV® server 5 via the local modem pool 2 (step 803). Assuming such connection is made, a determination is then made as to whether an IP (Internet Protocol) address, a port, and path information for the upgrade is stored in the flash memory 22b (decision block 804). The WebTV® server 5 may provide such information to the client 1 if the upgrade is to be downloaded from a server other than a default server, which may be the WebTV® server 5. If such information has been provided, then the client 1 connects to the specified server (step 805), requests the specified file (step 806), and initiates downloading of the file (step 807). If an IP address, port, and path are not found in flash memory 22b (no in decision block 804), then the client 1 connects to the default server using a default IP address, port, and path stored in mask ROM 22a (step 810). A default upgrade file is then requested using this stored information (step 811). In step 811, the client 1 also indicates to the default server which version of software it is currently running, so that the default server can determine the proper default file for that client system. Downloading of the default file is initiated in step 807 after the client 1 has requested a file. As mentioned above, downloading to the client 1 occurs via the Internet 3 via the modem pool 2. Once downloaded, the information is automatically decompressed (if compression was applied) and written into flash memory 22b the client system 1.

Hence, an optional upgrade is performed automatically without any input from the user of the client, other than the user's answering a prompt on whether to accept the upgrade. A mandatory upgrade is performed without any input from the user and, in fact, can be performed without informing the user, if desired.

Figure 9:
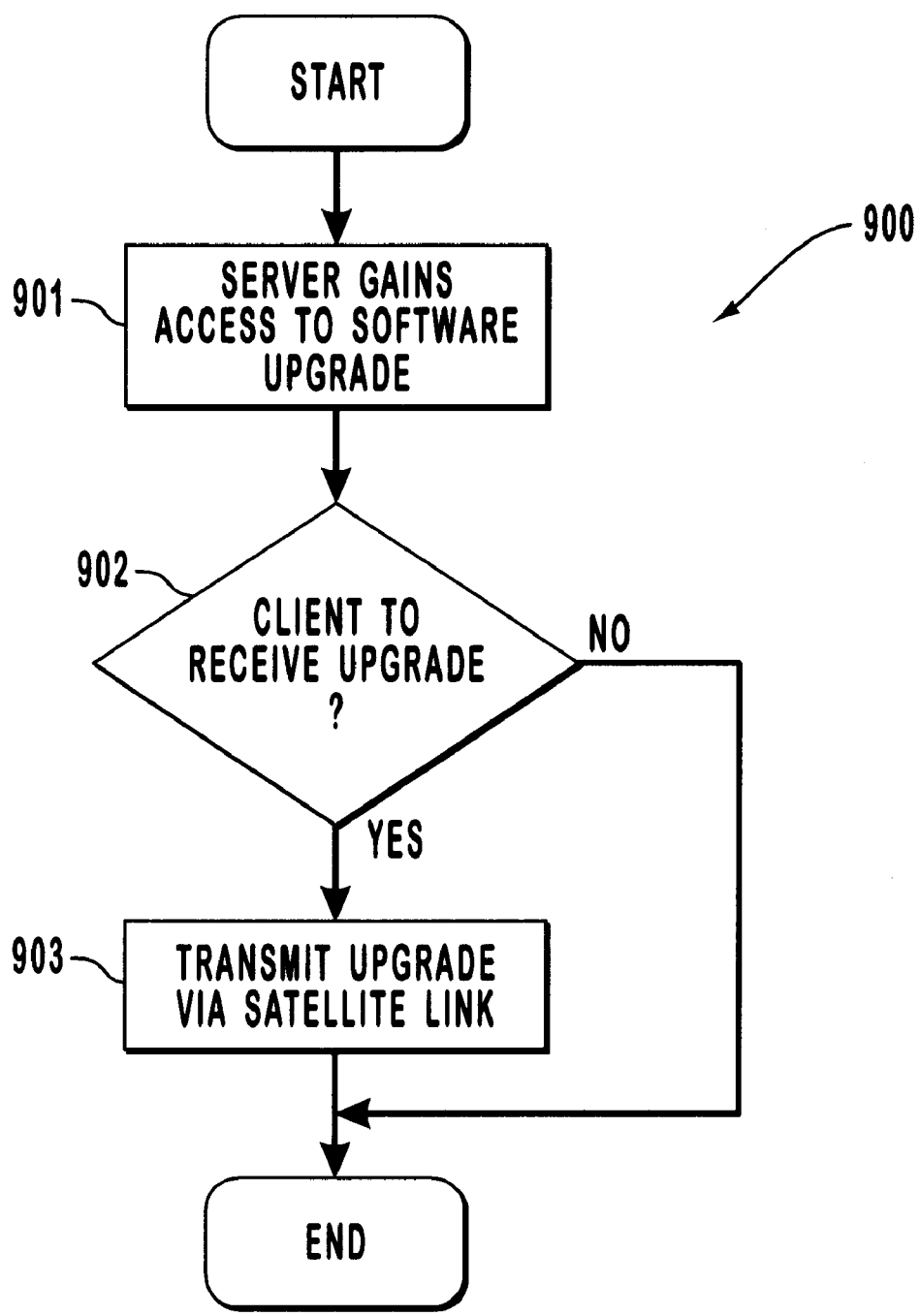
FIG. 9 is a flow diagram depicting a routine for transmitting software upgrades to clients via a satellite link.

While FIG. 7 and 8 illustrate automatic upgrading of software as the client system initiates a user session, the invention also extends to methods of upgrading software via a satellite link. Such upgrading of software via a satellite link may be conducted dependently of any initiation of a user session and independently of any process for checking for corrupted software. Using a satellite link, upgrades of software may be initiated at any time that the server gains access to a new version of software. FIG. 9 illustrates a method 900 whereby software is upgraded via the satellite link. Specifically, whenever there is an upgrade of the browser software, the software is made available to server 5 (step 901). If, according to decision block 902, client 1 is to receive the upgrade, the server 5 downloads the upgrade replacement program instructions to the client 1 (step 903). This is possible since the server 5 establishes the satellite link 29'without the two-way communication being established between server 5 and client 1. Thus, the client 1 need not affirmatively do anything in order to receive the downloaded upgrade over the satellite link 29' from the server 5.

The upgrade can be downloaded to client 1 at a time that client 1 is not engaging in two-way communication with server 5. In other words, the upgrade can be received via the satellite link at a time that client 1 has not logged on to server 5 and is otherwise not actively directing communication to the server. Moreover, the upgrade can be received at a time that client 1 is powered off. In this context, the term "powered off" refers to a state of the client wherein features other that ther ability ot receibe downloaded data from the statellite line are not enabled. For instance, in a powered off state, client 1 can receive downloaded software upgrades via that satellite, while being unable to browse the Internet or direct communication to server 5. When client 1 receives a software upgrade in a powered off state, the upgrade is stored at the client so that it can potentially replace the software stored at the client when the client is powered on.

An upgrade received according to the method of FIG. 9 can optionally be designated as mandatory or not mandatory by, for example, server 5. Designation of an upgrade as mandatory or not mandatory has been previously described in reference to FIG. 7. In the context of the method of FIG. 9, which uses a satellite link to download upgrades, the upgrades are transmitted to client 1 regardless of their mandatory or non-mandatory status. Mandatory upgrades automatically replace the prior version of the software at the client. Non-mandatory upgrades, however, only replace the prior version of software after the user of client 1 has been prompted to accept the upgrade and after the user has responded by providing user input indicating acceptance of the upgrade.

As stated above, the methods of FIG. 7 and FIG. 8 are optionally performed when the validity of the stored program information is confirmed (yes in decision block 602 of FIG. 6). However, if the step of automatically checking ascertains the existence of a corrupted state in the stored program instructions (no in decision block 602 of FIG. 6), the client 1 automatically corrects the stored program instructions as is now described.

First, the client system 1 automatically connects to at least one of the remote servers 4 without the need for intervention from the user and, if desired, without informing the user of the connection. Thus, embodiments within the scope of the present invention include a means and step for automatically connecting the client system 1 to at least one of the server systems 4 or 5 that contains a replacement for the stored program instructions of the client system 1.

There are a variety of ways for connecting a client system to a server system. If the location of the replacement program instructions is known, then a request can be automatically generated and transmitted over the Internet 3 to the appropriate server 4 or 5.

Figure 10:
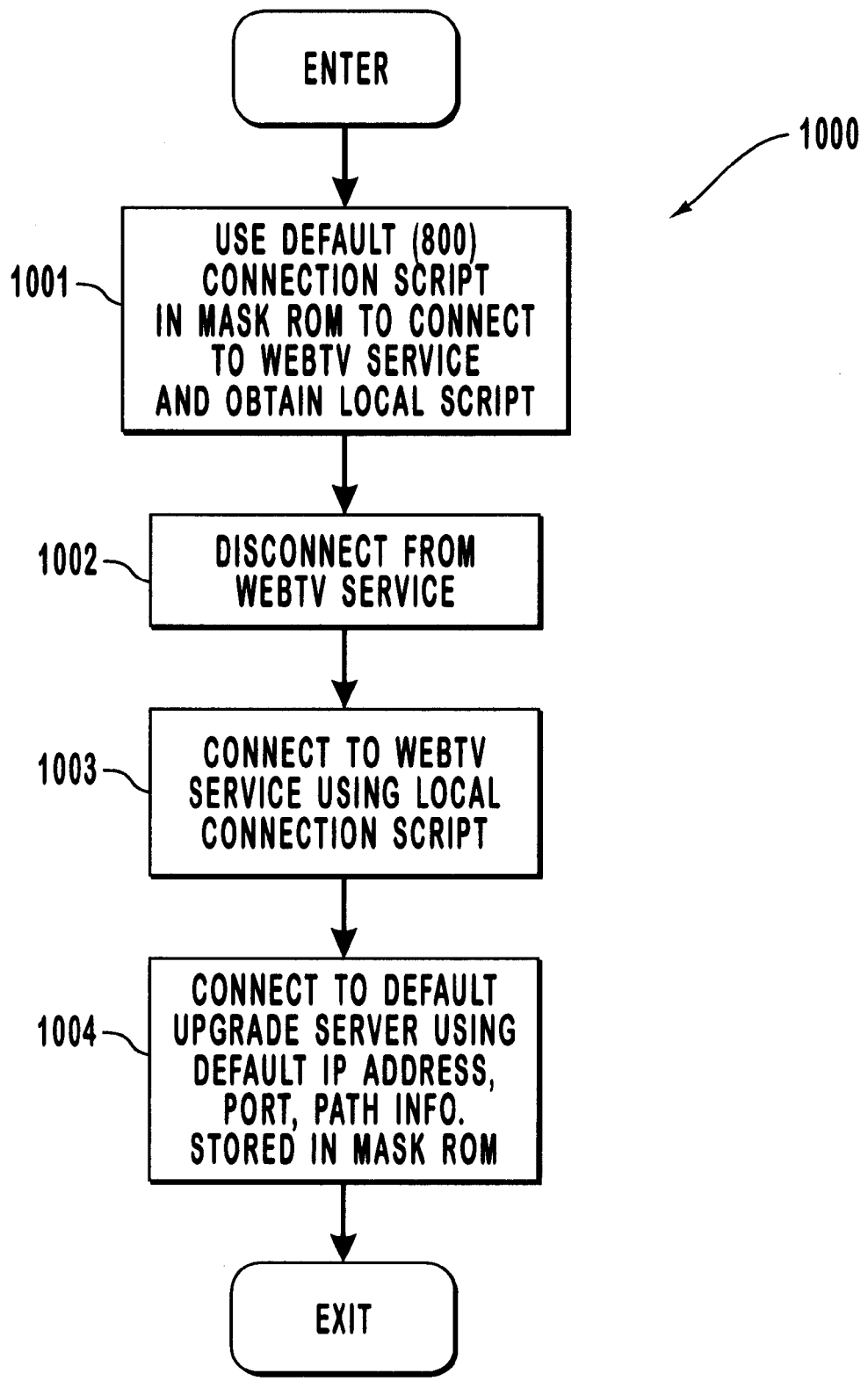
FIG. 10 is a flow diagram illustrating a routine for initiating a download to correct an error.

Another example of a method of automatically connecting the client 1 to a server that contains the replacement is represented by method 1000 of FIG. 10. Initially, the client 1 connects to the WebTV® server 5 directly using the default toll-free number stored in mask ROM 22a (step 1001). Once connected, the client system 1 obtains a local connection script from the server 5 (also step 1001). The client system 1 then disconnects from the server 5 (step 1002) and then reconnects to the server 5 via the local modem pool 2 using the local connection script (step 1003). The client 1 then further establishes a connection to the default server using the default IP address, port, and path stored in mask ROM 22a (step 1004).

After the client system 1 has connected to the appropriate server 4 or 5 that contains the replacement program instructions, the client 1 downloads the replacement program instructions from the server that contains the replacement. Accordingly embodiments within the scope of the present invention includes a means and step for automatically downloading the replacement from the server that contains the replacement.

Figure 11:
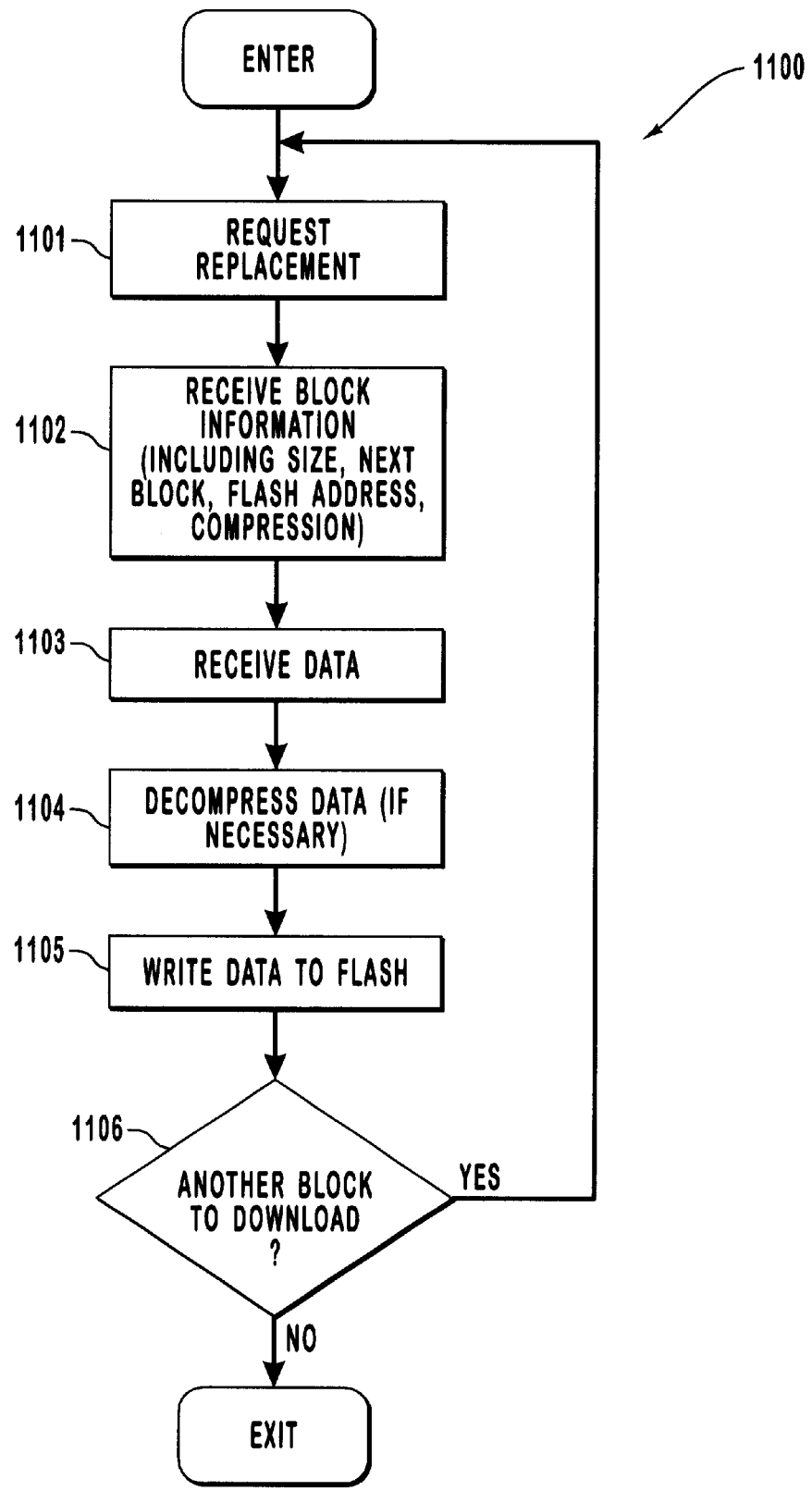
FIG. 11 is a flow diagram illustrating a routine for downloading to the WebTV® system from the network.

FIG. 11 illustrates the downloading process 1100 in greater detail. To initiate downloading, the client system 1 transmits a request to the default server (step 1101). For example, the request may be for the replacement software from the default server using the default IP address, port, and path. The client 1 also indicates to the server which version of software it is currently running, so that the server can determine the proper default file for client 1.

In one embodiment, the client system 1 requests the replacement program instructions by block number. In this case, the client system 1 receives certain block information (step 1102) from the default server that will transmit the data, including the size of the block to be downloaded, an identification of the next block to be downloaded, the address in flash memory 22b to which the current block is to be written, and a description of any data compression that is to be applied before transmission over the Internet 3. The data is then transmitted over the Internet 3 to the client 1.

The client system 1 then receives the data (step 1103) via the network connection 29 and loads the data into RAM 23. The client system 1 decompresses the data (step 1104), assuming data compression was used. The client 1 writes the decompressed data into flash memory 22b (step 1105) using the address received in step 1102. If there is another block to be downloaded according to the next block information (yes in decision block 1106), the routine 1100 repeats from step 1101. Otherwise, the routine ends.

Thus, various methods according to the invention for upgrading or restoring software stored at the client have been disclosed. Corrupted or inoperable software can be restored automatically when a client is powered on by receiving replacement software from the server. Outdated software can be replaced at any time by receiving at the client a download of a software upgrade via a satellite link. The methods of restoring corrupted software and upgrading outdated software can be practiced in combination or separately as desired.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a networked system that includes a client that stores program instructions, a server, and a network infrastructure having a two-way communication link for providing two-way communication between the client and the server and a satellite link for providing one-way communication to the client, a method for upgrading the program instructions stored at the client, comprising the steps for:

determining at the server that an upgrade of the program instructions is available;

determining whether the upgrade is mandatory or not mandatory; and at a time when the two-way communication is not established over the two-way communication link, downloading the upgrade of the program instructions to the client via the satellite link, wherein:

if the upgrade is mandatory, the program instructions stored at the client are replaced automatically by the upgrade of the program instructions; and if the upgrade is not mandatory, a user of the client is prompted to decide whether to accept the upgrade.

2. A method as defined in claim 1, wherein it is determined that the upgrade is not mandatory, the method further comprising the steps for:

storing the upgrade of the program instructions at the client; and only upon receiving user input indicating that the user has decided to accept the upgrade, replacing the program instructions stored at the client with the upgrade of the program instructions.

3. A method as defined in claim 1, wherein the step for downloading the upgrade is conducted at time that the client is in a powered off state, wherein features of the client other than a capability to receive a download from the satellite link are not enabled.

4. A method as defined in claim 3, further comprising, after the step for downloading the upgrade, the step for powering on the client, such that said features of the client are enabled.

5. A method as defined in claim 4, further comprising the step for replacing the program instructions stored at the client with the upgrade of the program instructions after the step for powering on the client.

6. In a client that stores program instructions and is connected with a networked system that includes a server and a network infrasstructure having a two-way communication link for providing two-way communication between the client and the server and a satellite link for providing one-way communication to the client, a method for upgrading the program instructions stored at the client, comprising the steps for:

communicating with the server using the two-way communication link;

terminating communication with the sever;

receiving, from the server, a download of an upgrade of the program instructions via the satellite link;

determining whether the upgrade is designated as being mandatory or not mandatory;

if the upgrade is designated as being mandatory, automatically replacing the program instructions stored at the client with the upgrade of the program instructions; and if the upgrade is designated as being not mandatory, prompting a user of the client to decide whether to accept the upgrade.

7. A method as defined in claim 6, wherein the step for receiving the download of the upgrade is conducted at time that the client is in a powered off state, wherein features of the client other than a capability to receive a download from the satellite link are not enabled.

8. A method as defined in claim 9, further comprising, after the step for receiving the download, the step for powering on the client, such that said features of the client are enabled.

9. A method as defined in claim 6, wherein the upgrade has been designated as not mandatory, the step for replacing the program instructions with the upgrade of the program instructions being conducted only after a user of the client has indicated acceptance of the upgrade.

10. A computer program product for implementing, in a client that stores program instructions and is connected with a networked system that includes a server and a network infrastructure having a two-way communication link for providing two-way communication between the client and the server and a satellite link for providing one-way communication to the client, a method for automatically upgrading the program instructions stored at the client, the computer program product comprising:

a computer-readable medium carrying computer-executable instructions for implementing the method, the computer-executable instructions comprising:

program code means for receiving a download of an upgrade of the program instructions via the satellite link during a time that the two-way communication is not established over the two-way communication link, the download being conducted in response to a determination at the server that the upgrade is available;

program code means for determining whether the upgrade is designated as being mandatory or not mandatory; and program code means for replacing the program instructions stored at the client with the upgrade of the program instruction wherein:

if the upgrade is designated as being mandatory, the program instructions stored at the client are automatically replaced with the upgrade of the program instructions; and if the upgrade is designated as being not mandatory, a user of the client is prompted to decide whether to accept the upgrade.

11. A computer program product as defined in claim 10, wherein the computer-executable instructions further comprise program code means for determining whether the upgrade has been designated as mandatory or not mandatory.

12. A computer program product as defined in claim 11, wherein the program code means for replacing the program instructions operate only if the user provides user input indicating that the user has decided to accept the upgrade.

13. A system used for downloading an upgrade of program instructions from a server to a client, the system comprising:

a server;

a client that stores program instructions, wherein the server and the client are connected via a network infrastructure having a two-way communication link for providing two-way communication; and a satellite link for providing one-way communication from the server to the client, wherein the satellite link is used for downloading an upgrade of the program instructions from the server to the client, wherein:

the upgrade of the program instructions is downloaded to the client without the client having requested the upgrade; and the upgrade is designated by the server as being mandatory or not mandatory, wherein:

if the if the upgrade is mandatory, the program instructions stored at the client are replaced automatically by the upgrade of the program instructions; and if the upgrade is not mandatory, a user of the client is prompted to decide whether to accept the upgrade.

14. A system as defined in claim 13, wherein the upgrade is downloaded via the satellite link during a time when the client is in a powered off state, wherein features of the client other than a capability to receive a download from the server via the satellite link are not enabled.

15. A system as defined in claim 14, wherein the client is powered on after the upgrade is downloaded via the satellite link, such that the features of the client are enabled.

16. A system as defined in claim 15, wherein:

the upgrade is designated as being mandatory; and the upgrade automatically replaces the program instructions stored at the client after the client is powered on.

17. A method as defined in claim 1, wherein, if the upgrade is designated as mandatory, the upgrade of the program instructions is downloaded to the client and the program instructions stored at the client are replaced automatically with the upgrade without the user being informed thereof.

18. A method as defined in claim 1, wherein the step for downloading the upgrade of the program instructions is performed without input from the user.

19. A method as defined in claim 1, wherein the step for downloading the upgrade of the program instructions is performed without the server having received a request from the client for the upgrade.

20. A method as defined in claim 19, wherein the client includes a television set that operates as a display device for displaying information processed by the program instructions and further is capable of displaying television programming transmitted to the client via the satellite link.

21. A method as defined in claim 6, wherein the step for receiving a download of an upgrade of the program instructions via the satellite link is performed without the client having requested the upgrade of the program instructions.

22. A method as defined in claim 21, further comprising the step for storing the upgrade of the program instructions in a flash memory of the client after the upgrade has been downloaded to the client.

23. A method as defined in claim 6, wherein, if the upgrade has been designated as being mandatory, the step for automatically replacing the program instructions stored at the client with the upgrade of the program instructions is performed without informing the user thereof.

24. A computer program product as defined in claim 10 wherein the step for downloading the upgrade of the program instructions is performed when the client is not logged on to the server.

25. In a networked system that includes a client that stores program instructions, a server, and a network infrastructure having a two-way communication link for providing two-way communication between the client and the server and a satellite link for providing one-way communication to the client, wherein the client includes a television that operates as a display device for displaying information processed by the program instructions, a method for upgrading the program instructions stored at the client, comprising the steps for:

determining at the server that an upgrade of the program instructions is available;

determining whether the upgrade is mandatory or not mandatory; and at a time when the two-way communication is not established over the two-way communication link, downloading the upgrade of the program instructions to the client via the satellite link, the upgrade of the program instructions being downloaded without the server having received a request from the client for the upgrade, wherein:

if the upgrade is mandatory, the program instructions stored at the client are replaced automatically by the upgrade of the program instructions; and if the upgrade is not mandatory, a user of the client is prompted to decide whether to accept the upgrade.

* * * * *

UNITED STATES PATENT AND TRADEMARK OFFICE
CERTIFICATE OF CORRECTION

PATENT NO.   : 6,473,099 B1
DATED        : October 29, 2002
INVENTOR(S)  : Phillip Y. Goldman et al.

It is certified that error appears in the above-identified patent and that said Letters Patent is hereby corrected as shown below:

<u>Title page,</u>
Item [56], U.S. PATENT DOCUMENTS, "5,678,002" reference change "Fawrett" to -- Fawcett --

<u>Column 2,</u>
Line 3, after "time" change "consumer" to -- consuming --

<u>Column 5,</u>
Line 33, after "medium" insert a period

<u>Column 7,</u>
Line 57, after "restored" insert -- by --

<u>Column 9,</u>
Line 63, after "conducted" change "dependently" to -- independently --

<u>Column 10,</u>
Line 20, after "other" change "that" to -- than --
Line 20, before "ability" change "ther" to -- the --
Line 20, before "downloaded" change "ot receibe" to -- to receive --

<u>Column 11,</u>
Line 11, after "Accordingly" insert a comma
Line 21, after "for" insert -- that --

<u>Column 12,</u>
Line 60, after "claim" change "9," to -- 7, --

UNITED STATES PATENT AND TRADEMARK OFFICE
CERTIFICATE OF CORRECTION

PATENT NO.    : 6,473,099 B1
DATED         : October 29, 2002
INVENTOR(S)   : Phillip Y. Goldman et al.

It is certified that error appears in the above-identified patent and that said Letters Patent is hereby corrected as shown below:

<u>Column 13,</u>
Line 23, after "program" change "instruction" to -- instructions, --
Line 53, before "upgrade" delete "if the"

Signed and Sealed this

Twenty-sixth Day of August, 2003

JAMES E. ROGAN
*Director of the United States Patent and Trademark Office*